US007810864B2

(12) United States Patent
Shimizu

(10) Patent No.: US 7,810,864 B2
(45) Date of Patent: Oct. 12, 2010

(54) OPENING AND CLOSING DEVICE

(75) Inventor: Masaaki Shimizu, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 647 days.

(21) Appl. No.: 11/783,767

(22) Filed: Apr. 12, 2007

(65) Prior Publication Data

US 2007/0241585 A1 Oct. 18, 2007

(30) Foreign Application Priority Data

Apr. 14, 2006 (JP) ............................ 2006-112552

(51) Int. Cl.
*B60J 5/06* (2006.01)
*B60J 5/10* (2006.01)

(52) U.S. Cl. ................ 296/146.4; 296/146.8; 296/155; 49/28

(58) Field of Classification Search ............. 296/146.4, 296/146.8, 155, 146.1; 49/26, 28, 502
See application file for complete search history.

(56) References Cited

U.S. PATENT DOCUMENTS 5,046,283 A * 9/1991 Compeau et al. .............. 49/138
6,183,040 B1 * 2/2001 Imaizumi et al. ............ 296/155
6,814,394 B2 * 11/2004 Yogo et al. .................. 296/155
6,955,389 B2 * 10/2005 Suzuki et al. ............ 296/146.4
7,204,544 B2 * 4/2007 Hermansson ............... 296/155
7,210,731 B2 * 5/2007 Ichinose et al. ............. 296/155
7,267,391 B2 * 9/2007 Yokomori ................... 296/155
7,438,346 B1 * 10/2008 Breed ...................... 296/146.4

FOREIGN PATENT DOCUMENTS

JP A-2004-257788 9/2004

* cited by examiner

*Primary Examiner*—Glenn Dayoan
*Assistant Examiner*—Gregory Blankenship
(74) *Attorney, Agent, or Firm*—Posz Law Group, PLC

(57) ABSTRACT

An opening and closing device includes an electrically conductive fixed body, a movable body, a drive motor, a speed control device, a detection assembly, and a determining device. The electrically conductive fixed body defines an opening portion therein. The movable body is displaceable between a full closed position and a full open position. The drive motor drives the movable body to open and close the opening portion of the fixed body. The detection assembly includes a sensor electrode. The determining device computes, as a detection value, a change amount of the capacitance at the sensor electrode per a predetermined constant measuring time based on the change of the capacitance detected by the sensor electrode. The determining device compares the detection value with a constant threshold value, and determines whether the object exists between the movable body and the periphery of the opening portion based on the comparison result.

6 Claims, 5 Drawing Sheets

OPENING AND CLOSING DEVICE

CROSS REFERENCE TO RELATED APPLICATION

This application is based on and incorporates herein by reference Japanese Patent Application No. 2006-112552 filed on Apr. 14, 2006.

BACKGROUND OF THE INVENTION

1. Field of the Invention

The present invention relates to an opening and closing device.

2. Description of Related Art

Conventionally, an opening and closing device includes a detector for detecting an existence of an object between a body of a vehicle and a door panel, which is in closing operation. Here, the opening and closing device uses a drive force of, for example, a motor to slidably displace (open and close) the door panel, which is provided on a side of a vehicle, along a longitudinal axis of the vehicle. For example, as JP-A-2004-257788 discloses, this type of detector includes a sensor electrode, which detects an object between a door panel and a body based on a change of a capacitance. The sensor electrode is disposed, for example, along a front end of a door panel. Also, in a case, where the object exists between the door panel and the body during a closing operation of the door panel for closing the door panel, the capacitance of the sensor electrode changes, and also the change of the capacitance is sent to a control unit of the detector as a signal voltage. The control unit, then, compares the received signal voltage and a predetermined threshold value. When the signal voltage exceeds the predetermined threshold value, the control unit determines that there is an object between the door panel and the body (determines the existence of the object between the door panel and the body), and the control unit displaces the door panel to a full open position using the drive force of the motor.

When the door panel in the closing operation approaches the full closed position, the front end of the door panel comes close to a front door and a center pillar (B pillar). Then, the proximity of the front end of the door panel to the front door and to the center pillar may cause a change of the capacitance of the sensor electrode, and therefore, the signal voltage may disadvantageously exceed the predetermined threshold value, resulting in an erroneous detection of the object. To deal with the above, conventionally, for example, when the door panel is located at a position of a predetermined distance away from the full closed position, the control unit adjusts the threshold value, and corrects the signal voltage sent by the detector in accordance with the change of the capacitance such that detectivity of the detector is set relatively lower to limit the erroneous detection of the object. Also, a constant threshold value may be set in an entire operational range of the door panel in consideration of the change of the capacitance due to the front door and the center pillar to limit the erroneous detection of the existence of the object.

However, in a case, where a threshold value is adjusted in accordance with a position of the door panel and the signal voltage is corrected to limit the erroneous detection of the object, a control process executed by the control unit for controlling the opening and closing device may disadvantageously become complex. Further, in another case, where a constant threshold value is set in an entire operational range of the door panel in consideration of the change of the capacitance due to the front door and the center pillar, the detectivity for detecting the object is also disadvantageously made lower even in other operational ranges of the door panel other than the range, where the capacitance is changed due to the front door.

SUMMARY OF THE INVENTION

The present invention is made in view of the above disadvantages. Thus, it is an objective of the present invention to address at least one of the above disadvantages.

To achieve the objective of the present invention, there is provided an opening and closing device, which includes an electrically conductive fixed body, a movable body, a drive motor, a speed control device, a detection assembly, and a determining device. The electrically conductive fixed body defines an opening portion therein. The movable body is displaceable between a full closed position and a full open position. The movable body closes the opening portion of the fixed body at the full closed position, and the movable body opens the opening portion of the fixed body at the full open position. The drive motor drives the movable body to open and close the opening portion of the fixed body. The speed control device controls a rotational speed of the drive motor to change a speed of displacement of the movable body. The detection assembly includes a sensor electrode, which is located on an end portion of the movable body toward the full closed position, wherein the detection assembly detects a change of a capacitance formed between the sensor electrode and an electrically conductive object adjacent to the sensor electrode. The determining device computes, as a detection value, a change amount of the capacitance at the sensor electrode per a predetermined constant measuring time based on the change of the capacitance detected by the sensor electrode. The determining device compares the detection value with a constant threshold value, which is used for determining whether the object exists between the movable body and an periphery of the opening portion. The determining device determines whether the object exists between the movable body and the periphery of the opening portion based on the comparison result.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention, which is embodied as a power sliding door system mounted on a vehicle, will be described below with reference to accompanying drawings.

Figure 1:
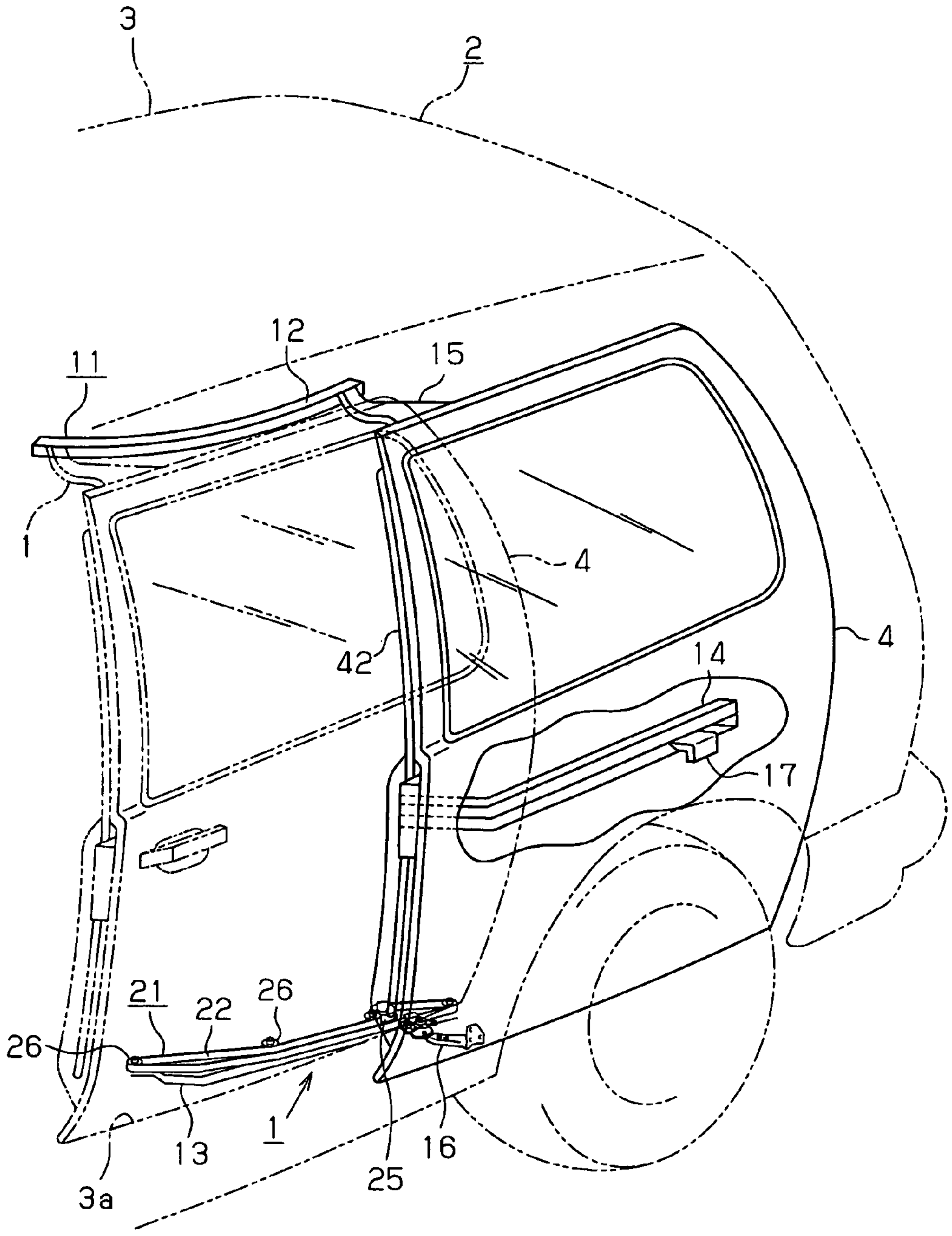
FIG. 1 is a perspective view of a vehicle provided with a power sliding door system according to an embodiment of the present invention.
Figure 4:
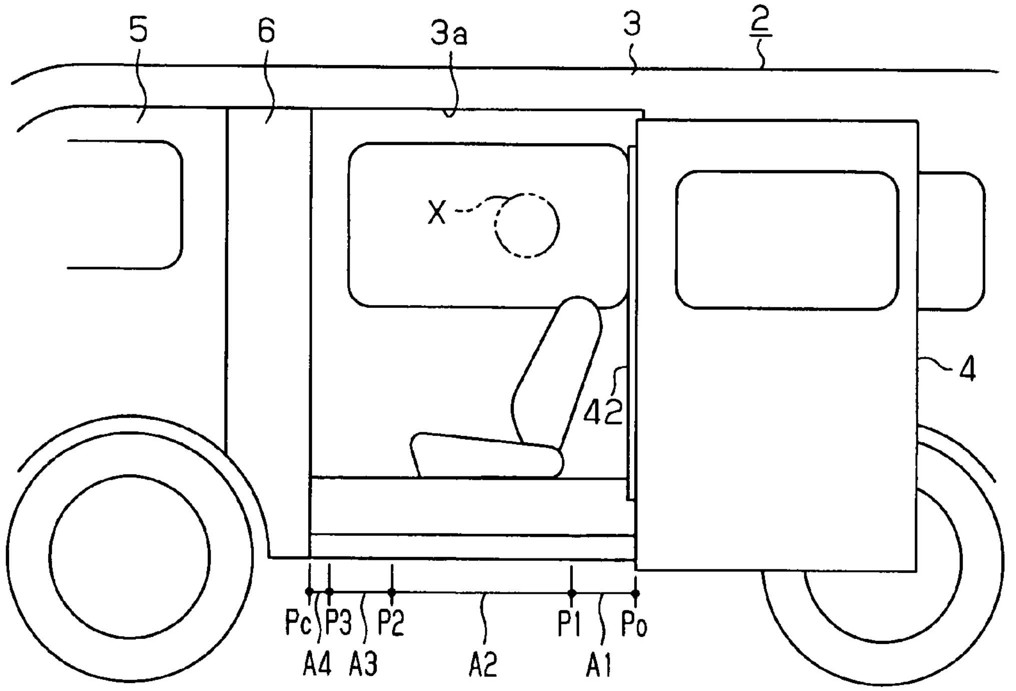
FIG. 4 is an explanatory view for describing a range of displacement a door panel.

FIG. 1 is a perspective view of a vehicle 2, which is mounted with a power sliding door system 1 (opening and closing device) of the present embodiment. As shown in FIG. 1, the vehicle 2 includes a body 3 (fixed body in the present invention) made of an electrically conductive material, and the body 3 has a quadrilateral-shaped passenger door opening 3*a*, which serves as an opening portion for a passenger to get into and out of the vehicle 2, on a left side surface. This passenger door opening 3*a* is made of an electrically conductive material, and is opened and closed by a quadrilateral-shaped door panel 4, which is shaped correspondingly to the passenger door opening 3*a*. Also, as shown in FIG. 4, an electrically conductive front seat side door panel 5 is provided frontward of the passenger door opening 3*a*, and an electrically conductive center pillar 6 is provided to extend in a vertical direction of the vehicle 2 (in an up-and-down direction in FIG. 4) between the front seat side door panel 5 and the door panel 4, which is located at a position for closing the passenger door opening 3*a*.

As shown in FIG. 1, the door panel 4 is displaceably coupled to the body 3 via a drive mechanism 11 displaceable approximately in the longitudinal direction of the vehicle (in a fore-and-aft direction) to open and close the passenger door opening 3*a*. Also, the door panel 4 includes a lock mechanism (not shown), such as a latch lock. This lock mechanism secures the door panel 4 relative to the body 3 such that the door panel 4 cannot be displaced when the door panel 4 is located at a position for closing the passenger door opening 3*a* (i.e., the door panel 4 is located at a full closed position for fully closing the passenger door opening 3*a*).

Then, the lock mechanism includes a intermediate latch detector (not shown) for detecting an intermediate state, where, for example, the lock mechanism does not completely secure the door panel 4 to the body 3 but the door panel 4 is unstably engaged with the body 3. The intermediate latch detector outputs an intermediate latch detection signal to a control circuit device 31 (see FIG. 2) of the power sliding door system 1 when the lock mechanism is in the intermediate state.

The drive mechanism 11 includes an upper rail 12, a lower rail 13, a center rail 14, an upper arm 15, a lower arm 16, and a center arm 17. The upper rail 12, the lower rail 13, and the center rail 14 are provided to the body 3, and the upper arm 15, the lower arm 16, and the center arm 17 are provided to the door panel 4.

The upper rail 12 and the lower rail 13 are provided to an upper portion and a lower portion of the passenger door opening 3*a* of the vehicle 2, respectively, and extend approximately in the longitudinal direction of the vehicle 2. The center rail 14 is provided approximately at a center portion of the vehicle 2 rearward of the passenger door opening 3*a*, and extends approximately in the longitudinal direction of the vehicle 2. These rails 12 to 14 are formed from an rear side to a front side of the vehicle to extend in the longitudinal direction of the vehicle 2, and a front end portion of each rail inwardly bends toward the vehicle cabin at a certain position of the rail.

Each of the arms 15 to 17 is fixed to a predetermined position of a surface of the door panel 4 (e.g., an upper portion, a lower portion, a center portion) facing toward the vehicle cabin. Then, the upper arm 15 is coupled to the upper rail 12, and the lower arm 16 is coupled to the lower rail 13. Also, the center rail 14 is coupled to the center arm 17. Thus, each of the arms 15 to 17 is guided by the corresponding rail 12 to 14 such that the arms 15 to 17 are displaceable in the longitudinal direction of the vehicle 2.

Also, the lower arm 16 is driven by a drive mechanism 21 in the longitudinal direction. Here, the drive mechanism 21 includes an endless belt 22, a slide actuator 23, a closer actuator 24 (see FIG. 2), which are mounted in the vehicle cabin. Also, the drive mechanism 21 includes a drive pulley 25 and multiple driven pulleys 26 at a location inward of the lower rail 13 toward the vehicle cabin. Here, the drive pulley 25 and the multiple driven pulleys 26 rotate about a vertical axis (up-and-down axis) of the vehicle 2. The endless belt 22 is wound around the drive pulley 25 and the driven pulleys 26. An end portion of the lower arm 16 is fixed to the endless belt 22.

Figure 2:
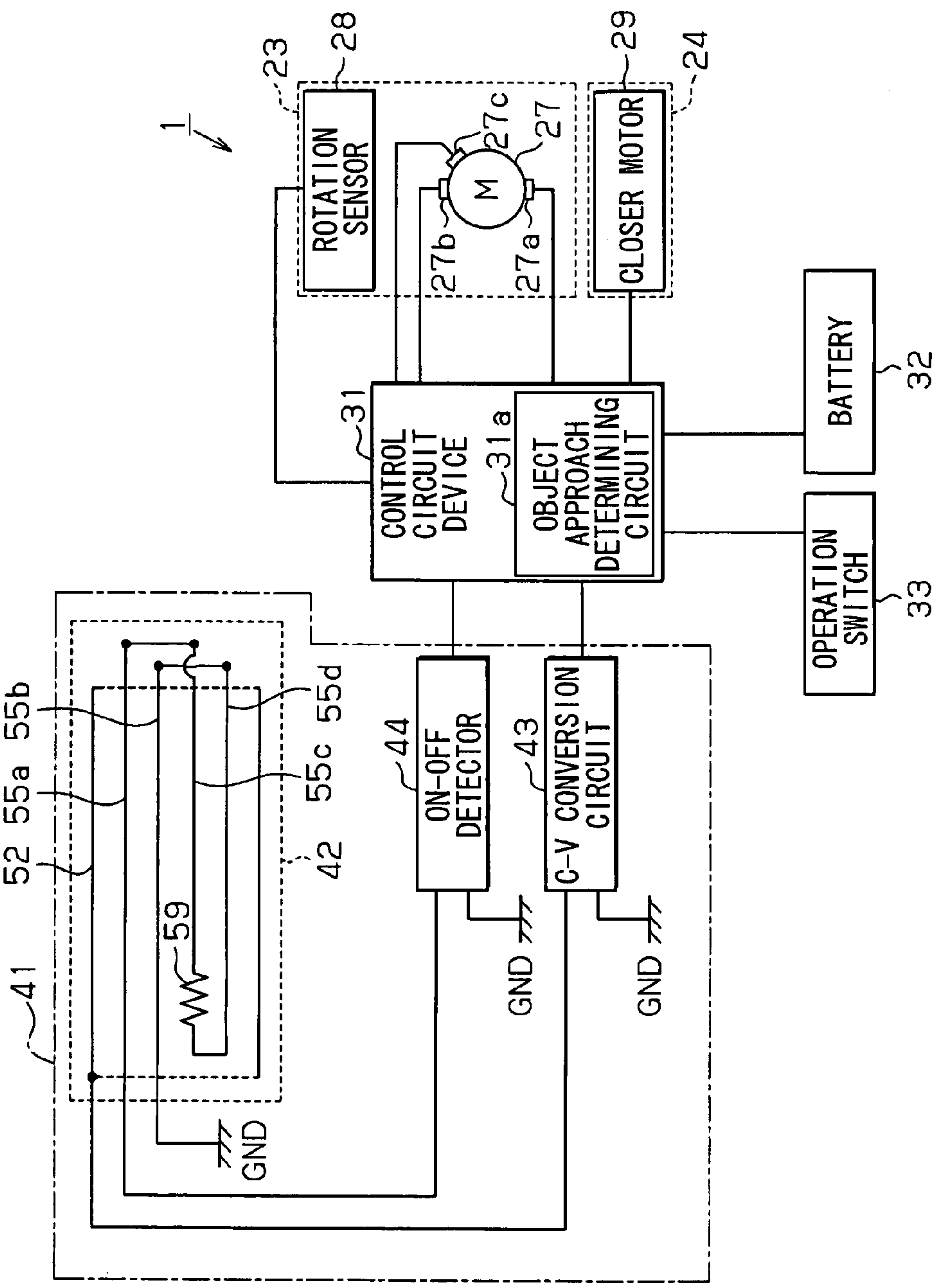
FIG. 2 is a block diagram of an electronic structure of the power sliding door system according to the embodiment.

The drive pulley 25 is connected with the slide actuator 23. As shown in FIG. 2, The slide actuator 23 includes a slide motor 27 and a reduction mechanism (not shown). The slide motor 27 is provided on the vehicle cabin side to serve as a drive motor, and the reduction mechanism reduces a rotational speed of slide motor 27 and transmits the reduced rotation to the drive pulley 25. When the slide motor 27 is driven to drive the drive pulley 25, the endless belt 22 is also driven and rotates such that the lower arm 16 is displaced in the longitudinal direction. Thus, the door panel 4 slides in the longitudinal direction.

Also, as shown in FIG. 2, the slide actuator 23 has a rotational speed sensor 28 therein for detecting the rotational speed of the slide motor 27 and for serving as a position detector. The rotational speed sensor 28 outputs a position detection signal to the control circuit device 31 in accordance with the rotation of the slide motor 27. The rotational speed sensor 28 includes a permanent magnet (not shown) and a hall element (not shown) to output a pulse signal as a position detection signal. Here, the permanent magnet rotates integrally with, for example, a rotational axis of the slide motor 27 or with a reduction gear (not shown) of the reduction mechanism. Also, the hall element is provided opposite the permanent magnet.

The closer actuator 24 is provided inside the door panel 4 shown in FIG. 1, and includes a closer motor 29 and a reduction mechanism (not shown). Here, the reduction mechanism reduces the rotational speed of the closer motor 29. When the closer motor 29 is driven, the door panel 4 is displaced to a position, where the lock mechanism can lock the door panel 4.

Also, the power sliding door system 1 includes an operation switch 33, which is electrically connected with the control circuit device 31. The operation switch 33 outputs an open command signal to the control circuit device 31, the signal for slidably displacing the door panel 4 to open the passenger door opening 3*a*, when a passenger operates the operation switch 33 to open the passenger door opening 3*a*. In contrast, when the passenger operates the operation switch 33 to close the passenger door opening 3*a*, the operation switch 33 outputs a close command signal to the control circuit device 31, the signal for slidably displacing the door panel 4 to close the passenger door opening 3*a*. The operation switch 33 may be provided, for example, to the vehicle 2 (e.g., instrument panel) and to a side face of the door panel 4 toward the vehicle cabin. The operation switch 33 may be also provided to a portable product (not shown), which is portable along with an ignition key.

Also, the power sliding door system 1 includes an object detector 41 as a detection assembly of the present invention. The object detector 41 of the present embodiment includes a sensor body 42, a C-V conversion circuit 43 and an ON-OFF detector 44.

Figure 3A:
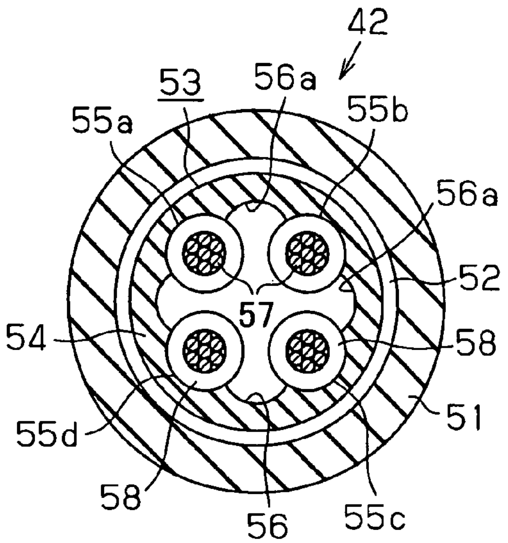
FIG. 3A is a cross-sectional views of a sensor body according to the embodiment.

As shown in FIG. 1, the sensor body 42 is provided at an end portion of the door panel 4 facing in a displacing direction (travel direction) in the closing operation (i.e., at a front end of the door panel 4). As shown in FIG. 3A, the sensor body 42 has a cable shape, and includes a tubular outer cover 51, which is made by a dielectric material and is resiliently deformable. The outer cover 51 receives an electrically conductive tubular sensor electrode 52. As shown in FIG. 2, the sensor electrode 52 is electrically connected with the C-V conversion circuit 43, and is supplied with power from a battery 32 via the control circuit device 31 and the C-V conversion circuit 43. Then as shown in FIG. 3A, the sensor electrode 52 has a pressure-sensitive portion 53 therein.

The pressure-sensitive portion 53 includes a supporting member 54 provided inside the sensor electrode 52, and four electrode wirings 55*a* to 55*d* provided inside the supporting member 54. The supporting member 54 is made of a dielectric and resilient material (e.g., a soft synthetic resin material, a rubber), and has a center hole 56, which extends in a longitudinal direction of the supporting member 54, at a center portion of the supporting member 54. The center hole 56 has four separate recesses 56*a*, which are recessed radially outwardly and are spaced away from adjacent ones by a predetermined angle in a circumferential direction. As a result, the center hole 56 has a cross section, which is taken perpendicularly to the longitudinal direction of the supporting member 54, of a cross joint shape. Also, the center hole 56 extends in the longitudinal direction of the supporting member 54 such that each of the four separate recesses 56*a* extends approximately helically around a center axis of the supporting member 54.

Also, the electrode wirings 55*a* to 55*d*, which are supported by the supporting member 54, are provided inside the supporting member 54. Each of the electrode wirings 55*a* to 55*d* has a cord conductor 57 and a tubular conductive cover 58. Here, the cord conductor 57 is made of twisted conductive fine wires (e.g., lead wires) and is flexible. Also, the tubular conductive cover 58 is electrically conductive and covers an outer periphery of the conductor 57. Each of the electrode wirings 55*a* to 55*d* is located between corresponding ones of the four separate recesses 56*a* to form a helical shape inside the supporting member 54. Also, when observing a cross section of the pressure-sensitive portion 53 taken in a radial direction, each of the electrode wirings 55*a* to 55*d* is attached integrally with a side of the supporting member 54 toward the center hole 56, and half of an outer periphery of each of the electrode wirings 55*a* to 55*d* toward the supporting member 54 is embedded in the supporting member 54.

Also, as shown in FIG. 2, the electrode wiring 55*a* and the electrode wiring 55*c* are mutually connected at longitudinal ends thereof, and the electrode wiring 55*b* and the electrode wiring 55*d* are also mutually connected at longitudinal ends thereof. Then, the electrode wiring 55*c* and the electrode wiring 55*d* are connected with each other via a resistor 59 at the other longitudinal ends thereof. Furthermore, the electrode wiring 55*b* has the other longitudinal end connected with a ground GND, which is grounded. Also, the electrode wiring 55*a* has the other longitudinal end electrically connected with the ON-OFF detector 44. Also, the electrode wiring 55*a* is supplied with power from the battery 32 via the control circuit device 31 and the ON-OFF detector 44.

Figure 3B:
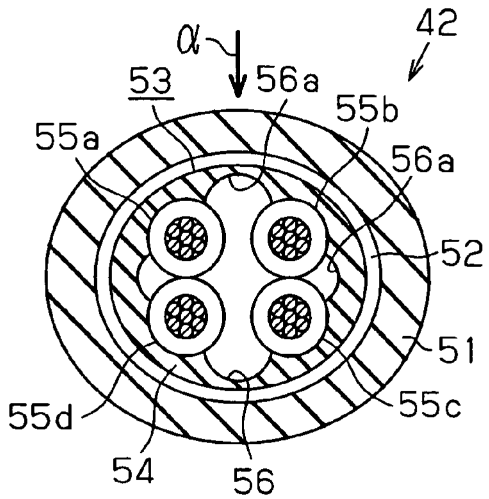
FIG. 3B is a cross-sectional views of a sensor body in a state, where a press force is applied thereto, according to the embodiment.

The above sensor body 42, as shown in FIG. 1, is provided to the front end of the door panel 4 via a dielectric supporting member (not shown), and extends along the front end of the door panel 4 in a up-and-down direction of the door panel 4. Then, as shown in FIG. 3B, for example, when the sensor body 42 is applied with a press force in a direction α depicted as an arrow, the outer cover 51, the sensor electrode 52 and the supporting member 54 are resiliently deformed. At this time, if the press force, which is applied to the supporting member 54, and which resiliently deforms the supporting member 54, is so large that the center hole 56 is crushed, one of the electrode wiring 55*a* and the electrode wiring 55*c* contacts one of the electrode wiring 55*b* and the electrode wiring 55*d* for form electrical connection with each other. When the press force is removed, the outer cover 51, the sensor electrode 52, and the supporting member 54 return to their original positions, and the electrode wirings 55*a* to 55*d* also return to their original position. Therefore, this disconnects the above electrical connection.

The ON-OFF detector 44, together with the pressure-sensitive portion 53, constitutes a touch-sensitive sensor for detecting an object X (see FIG. 4) by contacting the object X disposed between the door panel 4 and the periphery of the passenger door opening 3*a*. As shown in FIG. 2, the ON-OFF detector 44 is connected with the ground GND. Here, in a normal condition (shown in FIG. 3A), where the press force is not applied to the sensor body 42, a current supplied to the electrode wiring 55*a* flows via the resistor 59 when the current flows from the electrode wirings 55*a* to the electrode wiring 55*b* via the electrode wirings 55*c*, 55*d*. However, when the press force is applied to the sensor body 42 (e.g., in a condition shown in FIG. 3B), the supporting member 54 is resiliently deformed, and one of the electrode wiring 55*a* and the electrode wiring 55*c* contacts one of the electrode wiring 55*b* and the electrode wiring 55*d* to form the electrical connection therebetween (e.g., to form a short circuit). Then, the current flows from the electrode wiring 55*a* to the electrode wiring 55*b* via the electrode wirings 55*c*, 55*d* without flowing through the resistor 59. Thus, a voltage value between the electrode wiring 55*a* and the ground GND changes compared with a voltage value between the electrode wiring 55*a* and the ground GND in the normal condition. The ON-OFF detector 44 detects the change of the voltage value between the electrode wiring 55*a* and the ground GND at this time, and outputs a voltage value detection signal to the control circuit device 31. Here, the voltage value detection signal indicates a change of a voltage value due to the short circuit formed by the connection between one of the electrode wiring 55*a* and the electrode wiring 55*c* and one of the electrode wiring 55*b* and the electrode wiring 55*d*. For example, the ON-OFF detector 44 has a threshold value determined based on a voltage value between the electrode wiring 55*a* and the ground GND in the normal condition. When the detected voltage value between the electrode wiring 55*a* and the ground GND exceeds the threshold value, the voltage value detection signal is outputted.

As shown in FIG. 2, the C-V conversion circuit 43 is electrically connected with the sensor electrode 52, and constitutes, together with the sensor electrode 52, a capacitance sensor for sensing the object X located between the door panel 4 and the periphery of the passenger door opening 3*a* in a non-contact manner. The C-V conversion circuit 43 is provided inside the door panel 4, and is electrically connected with the control circuit device 31. Also, the C-V conversion circuit 43 computes a change of a capacitance of the sensor electrode 52 per a predetermined measuring time t based on (in accordance with) a change of the capacitance sensed by the sensor electrode 52 between the sensor electrode 52 and the ground. Then, the C-V conversion circuit 43 outputs the computation result (detection value) to the control circuit device 31.

The power sliding door system 1 of the present embodiment is controlled by the control circuit device 31, which has an object approach determining circuit 31*a*. The control circuit device 31, for example, is provided at a vicinity of the slide motor 27 or is integral with the slide motor 27. Also, the control circuit device 31 is supplied with drive power from the battery 32 included by the vehicle 2.

the control circuit device 31 controls the slide actuator 23 and the closer actuator 24 in accordance with various signals received from the intermediate latch detector, the rotational speed sensor 28, the operation switch 33, the C-V conversion circuit 43, and the ON-OFF detector 44. Specifically, the control circuit device 31 controls the slide motor 27 such that the door panel 4 is opened (displaced) to a full open position Po, when the control circuit device 31 receives the open command signal from the operation switch 33. In contrast, the control circuit device 31 controls the slide motor 27 such that the door panel 4 is closed (displaced) to a full closed position Pc when the control circuit device 31 receives the close command signal from the operation switch 33. Also, the control circuit device 31 controls the closer motor 29 to displace the door panel 4 to a position, where the lock mechanism can lock the door panel 4 when the control circuit device 31 receives the intermediate latch detection signal from the intermediate latch detector. Further, the control circuit device 31 detects a slide amount of the door panel 4 (i.e., a position of the door panel 4) based on a position detection signal received from the rotational speed sensor 28.

Here, the slide motor 27 of the present embodiment includes three brushes, such as a common brush 27*a*, a low speed brush 27*b*, and a high speed brush 27*c*. The common brush 27*a* is arranged on an opposite side of a rotation axis (not shown) of the slide motor 27 opposite from the low speed brush 27*b*, and the high speed brush 27*c* is located at a position, which is angled by a predetermined rotation angle away relative to the low speed brush 27*b*. Also, the slide motor 27 is supplied with drive power via the common brush 27*a* and the low speed brush 27*b*, or via the common brush 27*a* and the high speed brush 27*c*. In this case, the drive power supplied to the slide motor 27 via the low speed brush 27*b* rotates the slide motor 27 at a low speed with a high torque. In contrast, the drive power supplied to the slide motor 27 via the high speed brush 27*c* rotates the slide motor 27 at a relatively higher speed with a relatively lower torque compared with the case where the drive power is supplied via the low speed brush 27*b*.

As shown in FIG. 4, the control circuit device 31 sets a latch operation range A4, which ranges from the full closed position Pc to a nearly closed position P3. Here, the nearly closed position P3 is located away from the full closed position Pc toward the full open position Po. Also, the control circuit device 31 defines a slide operation range (ranges A1 to A3) ranged between the full open position Po and the nearly closed position P3. Furthermore, in the slide operation range, the control circuit device 31 defines an open-side operation range A1, a middle operation range A2, and a closed-side operation range A3. The open-side operation range A1 ranges from the full open position Po to a first door position P1, which is located a predetermined distance away from the full open position Po toward the full closed position Pc. The closed-side operation range A3 ranges from the nearly closed position P3 to a second door position P2, which is located a predetermined distance away from the nearly closed position P3 toward the full open position Po. Also, the middle operation range A2 located between the ranges A1 and A3 (e.g., the middle operation range A2 ranges from the first door position P1 to the second door position P2 in one embodiment). Here, in FIG. 4 and FIGS. 5A to 5C, for clear description, the latch operation range A4 is depicted wider than an actual width, which actually is substantially narrower than the slide operation range (ranges A1 to A3). Here, the middle operation range A2 corresponds to a high speed operation range, and the closed-side operation range A3 corresponds to a low speed operation range of the present invention.

In the present embodiment, an actual change of a capacitance actually detected in advance by the sensor electrode 52 in a condition, where the object X is not located (i.e., the object X is absent) between the door panel 4 and the periphery of the passenger door opening 3*a* while the door panel 4 is in the closing operation (i.e., while the door 4 is displaced toward the full closed position Pc). And then, the second door position P2 (closed-side position in the present invention) is determined based on the above detected change of the capacitance. Specifically, the second door position P2 is set at a position, where a change amount of the capacitance detected by the sensor electrode 52 starts increasing due to the proximity of the front end of the door panel 4 to the center pillar 6 during the closing operation of the door panel 4.

In the above the slide operation range (ranges A1 to A3), when the door panel 4 is opened (displaced) from the nearly closed position P3 to the full open position Po, the control circuit device 31 controls the slide motor 27 such that the door panel 4 is displaced at a low speed in the closed-side operation range A3, which ranges from the nearly closed position P3 to the second door position P2, and the control circuit device 31 controls the slide motor 27 such that the door panel 4 is displaced at a high speed in the middle operation range A2, which ranges from the second door position P2 to the first door position P1. Here, the door panel 4 is displaced faster at the high speed in the middle operation range A2 than at the low speed in the closed-side operation range A3. Also, the control circuit device 31 controls the slide motor 27 such that the door panel 4 is displaced at a lower speed in the open-side operation range A1, which ranges from the first door position P1 to the full open position Po. Here, the door panel 4 is displaced slower at the lower speed in the open-side operation range A1 than at the high speed in the middle operation range A2. Typically, the control circuit device 31 controls the slide motor 27 such that a speed of displacement of the door panel 4 is gradually increased in the closed-side operation range A3, and such that the speed of displacement of the door panel 4 becomes constant in the middle operation range A2. Also, the control circuit device 31 controls the slide motor 27 such that the speed of displacement of the door panel 4 is gradually decreased in the open-side operation range A1. When the door panel 4 is closed (displaced) from the full open position Po to the nearly closed position P3, the control circuit device 31 controls the slide motor 27 such that the door panel 4 is displaced at the low speed in the closed-side operation range A3, at the high speed in the middle operation range A2, and at the low speed in the open-side operation range A1. Typically, the control circuit device 31 controls the slide motor 27 such that the speed of displacement of the door panel 4 is gradually increased in the open-side operation range A1, also such that the speed of displacement of the door panel 4 becomes constant in the middle operation range A2. Furthermore, the control circuit device 31 controls the slide motor 27 such that the speed of displacement of the door panel 4 is gradually decreased in the closed-side operation range A3. Therefore, a relation between the position of the door panel 4 and the speed of displacement of the door panel 4 becomes similar to the chart shown in FIG. 5A.

Here, the control circuit device 31 drives the closer motor 29 in the latch operation range A4, which ranges from the full closed position Pc to the nearly closed position P3, such that the door panel 4 is locked and unlocked by using the closer motor 29.

When the control circuit device 31 receives the voltage value detection signal from the ON-OFF detector 44 during the closing operation of the door panel 4, the control circuit device 31 determines that the object X exists between the door panel 4 and the periphery of the passenger door opening 3*a* based on the received voltage value detection signal, and the control circuit device 31 controls the slide motor 27 such that the door panel 4 is displaced to the full closed position Pc at a high speed.

The object approach determining circuit 31*a* has a threshold value for comparison with the detection value received from the C-V conversion circuit 43 for determining whether there is the object X between the door panel 4 and the periphery of the passenger door opening 3*a* as shown in FIG. 2. The threshold value is set as a constant value in the entire of the slide operation range (ranges A1 to A3) of the door panel 4 as shown in FIG. 5C. Also, during the closing operation of the door panel 4, a change of the capacitance is actually detected in advance by the sensor electrode 52 in a condition, where the object X is not located between the door panel 4 and the periphery of the passenger door opening 3*a*. Then, the above threshold value is determined based on the above actually detected change of the capacitance.

The object approach determining circuit 31*a* compares a detection value, which is received from the C-V conversion circuit 43 every interval of the measuring time t, with the threshold value. Then, the object approach determining circuit 31*a* determines that the object X exists between the door panel 4 and the periphery of the passenger door opening 3*a* when the detection value is larger than the threshold value. Also, the object approach determining circuit 31*a* determines that the object X does not exist (the object X is absent) between the door panel 4 and the periphery of the passenger door opening 3*a* when the detection value is smaller than the threshold value. When the object approach determining circuit 31*a* determines that there is the object X between the door panel 4 and the periphery of the passenger door opening 3*a*, the control circuit device 31 controls the slide motor 27 such that the door panel 4 is displaced to the full open position Po at the high speed.

Next, an overall operation of the power sliding door system 1 will be described.

The control circuit device 31 drives the slide motor 27 in the direction for opening the door panel 4 when the control circuit device 31 receives the open command signal from the operation switch 33, and the control circuit device 31 stops the slide motor 27 when the door panel 4 is positioned at the full open position Po.

In contrast, when the control circuit device 31 receives the close command signal from the operation switch 33, the control circuit device 31 drives the slide motor 27 in the direction for closing the door panel 4. In other words, the control circuit device 31 controls the slide motor 27 such that the door panel 4 is displaced at the low speed when the door panel 4 (the front end of the door panel 4) is in the open-side low speed range, and such that the door panel 4 is displaced at the high speed when the door panel 4 is in the middle operation range A2. Also, when the door panel 4 is in the closed-side operation range A3, the control circuit device 31 controls the slide motor 27 such that the door panel 4 is displaced at the low speed. Then, the control circuit device 31 drives the closer motor 29 such that the door panel 4 is locked by using the closer motor 29 in the latch operation range A4.

Also, the control circuit device 31 operates the object detector 41 when the control circuit device 31 receives the close command signal from the operation switch 33. Then, when the control circuit device 31 receives the voltage value detection signal from the ON-OFF detector 44, the control circuit device 31 determines that the object X is held between the door panel 4 and the periphery of the passenger door opening 3*a* (i.e., the object X exists between the door panel 4 and the periphery of the passenger door opening 3*a*) based on the input of the voltage value detection signal. Thus, the control circuit device 31 controls the slide motor 27 such that the door panel 4 is displaced to the full open position Po at the high speed.

During the closing operation of the door panel 4, every time the measuring time t elapses, the C-V conversion circuit 43 computes the change amount of the capacitance at the sensor electrode 52 per the measuring time t based on the change amount of the capacitance detected by the sensor electrode 52 between the sensor electrode 52 and the ground. Then, the C-V conversion circuit 43 outputs the computation result, that is the detection value, to the control circuit device 31. The object approach determining circuit 31*a* of the control circuit device 31 compares the inputted detection value with the threshold value every time the detection value is inputted. Then, when the detection value is smaller than the threshold value, the object approach determining circuit 31*a* determines that the object X does not exist between the door panel 4 and a peripheral portion of the passenger door opening 3*a*, that is, between the door panel 4 and the periphery of the passenger door opening 3*a*. In contrast, when the detection value is greater than the threshold value, the object approach determining circuit 31*a* determines that the object X exists between the door panel 4 and the periphery of the passenger door opening 3*a*. When the object approach determining circuit 31*a* determines that the object X exists (is located) between the door panel 4 and the periphery of the passenger door opening 3*a*, the control circuit device 31 controls slide motor 27 such that the door panel 4 is displaced to the full closed position Pc at the high speed.

By the way, the control circuit device 31 controls the speed of displacement of the door panel 4 in accordance with the position of the door panel 4. For example, when an electrically conductive object is located near the sensor electrode 52, a capacitance formed between the sensor electrode 52 and the electrically conductive object adjacent to the sensor electrode changes. The C-V conversion circuit 43 computes the change amount of the capacitance at the sensor electrode 52 per the predetermined measuring time t based on the change amount of the capacitance detected by the sensor electrode 52 between the sensor electrode 52 and the ground. Then, the object approach determining circuit 31*a* compares the detection value, which corresponds to the change amount of the capacitance per the measuring time t at the sensor electrode 52, with the threshold value to determine whether or not the object X exists between the door panel 4 and the periphery of the passenger door opening 3*a*. Thus, in a condition, where the object X exists between the door panel 4 and the periphery of the passenger door opening 3*a*, the change amount of the capacitance per the measuring time t at the sensor electrode 52 becomes greater when the speed of displacement of the door panel 4 is greater, and in contrast, the change amount becomes smaller when the speed of displacement of the door panel 4 is smaller. As a result, as shown in FIG. 5A and FIG. 5B, the detectivity for detecting the object X located between the door panel 4 and the periphery of the passenger door opening 3*a* depends on the speed of displacement of the door panel 4.

Figure 5A:
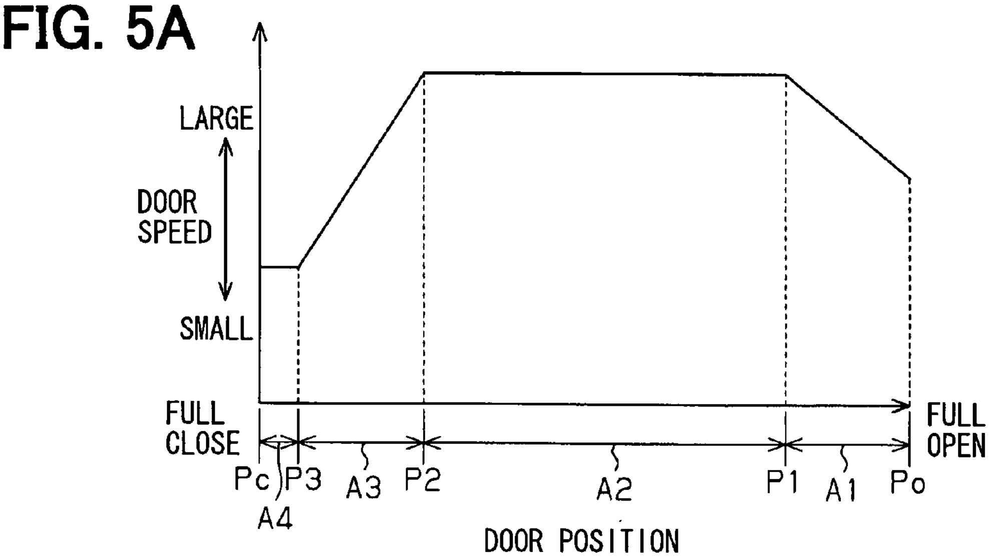
FIG. 5A is a chart showing a relation between a position of the door panel and a speed of the door panel.
Figure 5B:
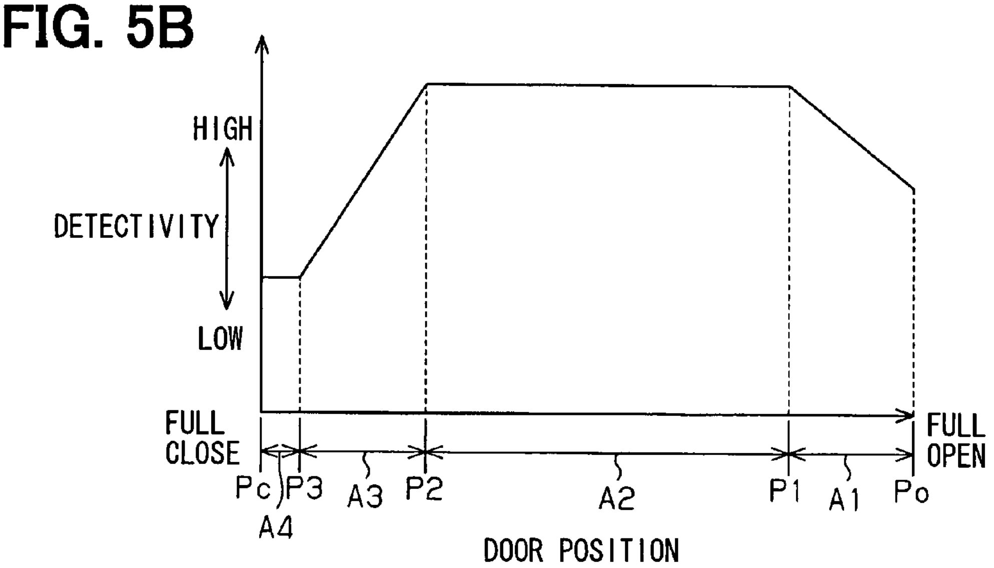
FIG. 5B is a chart showing a relation between the position of the door panel and a detectivity for detecting an object.
Figure 5C:
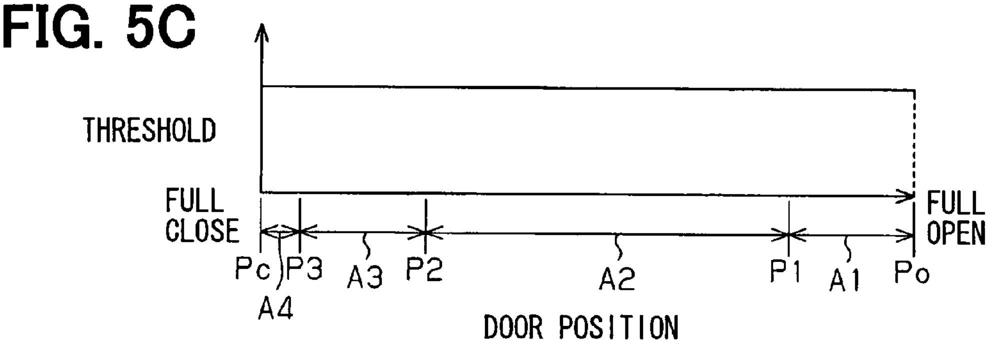
FIG. 5C is a chart showing a relation between the position of the door panel and a threshold value for detecting the object.

Specifically, as shown in FIG. 5A, in the open-side operation range A1 ranging from the full open position Po to the first door position P1, the door panel 4 is slidably displaced such that the speed of displacement thereof is gradually increased. Therefore, as shown in FIG. 5B, a detectivity for detecting the object X, which is located between the door panel 4 and the periphery of the passenger door opening 3*a*, is gradually increased in accordance with the speed of displacement of the door panel 4 while the door panel 4 is displaced from the full open position Po to the first door position P1.

Also, as shown in FIG. 5A, in the middle operation range A2 ranging from the first door position P1 to the second door position P2, the door panel 4 is slidably displaced at a constant speed higher than the speed of the door panel 4 in the open-side operation range A1. As a result, as shown in FIG. 5B, because the door panel 4 is displaced at the high speed, a detectivity for detecting the object X is higher than that in a case, where the door panel 4 is displaced in the open-side operation range A1, and the detectivity is constant while the door panel 4 is displaced in the middle operation range A2.

Furthermore, as shown in FIG. 5A, in the closed-side operation range A3 ranging from the second door position P2 to the nearly closed position P3, the door panel 4 is slidably displaced at a speed slower than that of the door panel 4 displaced in the middle operation range A2 such that the speed of displacement of the door panel 4 is gradually decreased. Therefore, as shown in FIG. 5B, the detectivity for detecting the object X is gradually decreased in accordance with the speed of displacement of the door panel 4 while the door panel 4 is displaced from the second door position P2 to the nearly closed position P3. As a result, in the closed-side operation range A3, where the change amount of the capacitance detected by the sensor electrode 52 tends to be gradually increased due to the proximity of the front end of the door panel 4 to the center pillar 6, it is possible to decrease the detectivity for detecting the object X that exists between the door panel 4 and the periphery of the passenger door opening 3*a*.

As described above, according to the present embodiment, effects and advantages below can be achieved.

(1) The control circuit device 31 controls a rotational speed of the slide motor 27 to change the speed of displacement of the door panel 4. Then, the object approach determining circuit 31*a* computes the change amount of the capacitance at the sensor electrode 52 per the predetermined constant measuring time t as the detection value based on the change of the capacitance detected by the sensor electrode 52. Further, the object approach determining circuit 31*a* compares the detection value with the constant threshold value for determining the existence of the object X between the door panel 4 and the periphery of the passenger door opening 3*a*, and the object approach determining circuit 31*a* determines whether or not the object X exists between the door panel 4 and the periphery of the passenger door opening 3*a* based on the comparison result. Here, in general, in a case, where the object X exists between the door panel 4 and the periphery of the passenger door opening 3*a*, the change amount of the capacitance at the sensor electrode 52 per the constant measuring time t becomes greater if the speed of displacement of the door panel 4 is greater, and in contrast, the change amount becomes smaller if the speed of displacement of the door panel 4 is smaller. Therefore, in a case, where the detection value as computed above is compared with the threshold value to determine whether or not the object X exists between the door panel 4 and the periphery of the passenger door opening 3*a*, the detectivity for detecting the object X between the door panel 4 and the periphery of the passenger door opening 3*a* depends on the speed of displacement of the door panel 4. As a result, the detectivity for detecting the object X between the door panel 4 and the periphery of the passenger door opening 3*a* by the object approach determining circuit 31*a* can be adjusted when the speed of displacement of the door panel 4 is controlled. Thus, an additional control, such as the adjustment of the threshold value in accordance with the position of the door panel 4, in order to limit the erroneous detection of the object X is not required. As a result, the control process executed by the control circuit device 31 is simplified, and therefore the control can be more simplified compared with a conventional opening and closing device.

(2) The control circuit device 31 detects the position of the door panel 4 based on the position detection signal that corresponds to the position of the door panel 4, and controls the rotational speed of the slide motor 27 in accordance with the ranges A1 to A3, in which the door panel 4 is positioned. Therefore, the rotational speed of the slide motor 27 depends on the position of the door panel 4. Also, the detectivity by the object approach determining circuit 31*a* for detecting the object X between the door panel 4 and the periphery of the passenger door opening 3*a* is changed based on the speed of displacement of the door panel 4. Thus, the detectivity for detecting the object X between the door panel 4 and the periphery of the passenger door opening 3*a* can be determined based on the position of the door panel 4. For example, in the closed-side operation range A3, where the change amount of the capacitance detected by the sensor electrode 52 tends to be gradually increased due to the proximity of the front end of the door panel 4 to the center pillar 6, the detectivity for detecting the object X between the door panel 4 and the periphery of the passenger door opening 3*a* can be decreased. Thus, the erroneous detection of the object X can be reduced. Also, because the detectivity can be changed in accordance with the position of the door panel 4, it is possible to define a range, where the detectivity for detecting the object X between the door panel 4 and the periphery of the passenger door opening 3*a* is set higher than that in the conventional case, where a constant threshold value is set in the entire operational range of a door panel.

(3) The control circuit device 31 controls the slide motor 27 such that the door panel 4 is displaced at the high speed in the middle operation range A2, and such that the door panel 4 is displaced at the low speed in the closed-side operation range A3. Therefore, during the closing operation of the door panel 4, the door panel 4 is displaced at the low speed in the closed-side operation range A3, where the change of the capacitance detected by the sensor electrode 52 may be influenced by the proximity of the door panel 4 to the periphery of the passenger door opening 3*a*, which opposes the front end of the door panel 4. Thus, in the closed-side operation range A3, the detectivity for detecting the object X between the door panel 4 and the periphery of the passenger door opening 3*a* by the object approach determining circuit 31*a* becomes low. As a result, during the closing operation of the door panel 4, it is possible to limit the disadvantageous erroneous detection of the object X due to the change of the capacitance at the sensor electrode 52 caused by the proximity of the door panel 4 to the periphery of the passenger door opening 3*a*. In contrast, in the middle operation range A2, which is located on a side of the closed-side operation range A3 toward the full open position Po, the door panel 4 is displaced at a higher speed than that in the closed-side operation range A3. Therefore, the detectivity for detecting the object X between the door panel 4 and the periphery of the passenger door opening 3*a* by the object approach determining circuit 31*a* becomes higher. Therefore, when the door panel 4 is positioned in the middle operation range A2, the object X located between the door panel 4 and the periphery of the passenger door opening 3*a* can be more accurately detected than the case, where the door panel 4 is positioned in the closed-side operation range A3.

(4) The threshold value is determined in advance based on an actual change of the capacitance detected by the sensor electrode 52 in a condition, where the object X is not located (i.e., the object X is absent) between the door panel 4 and the periphery of the passenger door opening 3*a* during the closing operation of the door panel 4. Therefore, the threshold value can be more preferably set (determined) in accordance with a shape of the front end of the door panel 4 and in accordance with a shape of the periphery of the passenger door opening 3*a*.

Here, the embodiment of the present invention may be modified as described below.

In the above embodiment, when the door panel 4 is positioned in the open-side operation range A1 and in the closed-side operation range A3, the control circuit device 31 controls the slide motor 27 such that the door panel 4 is displaced at the low speed. Also, when the door panel 4 is positioned in the middle operation range A2, the control circuit device 31 controls the slide motor 27 such that the door panel 4 is displaced at the high speed. However, a control example of the control circuit device 31 for controlling the slide motor 27 is not limited to the above. For example, the control circuit device 31 may alternatively control the slide motor 27 such that the door panel 4 is displaced at the high speed when the door panel 4 is positioned in the open-side operation range A1 and the middle operation range A2, and such that the door panel 4 is displaced at the low speed when the door panel 4 is positioned in the closed-side operation range A3.

In the above embodiment, the control circuit device 31 divides the slide range of the door panel 4 into the three ranges, such as the open-side operation range A1, the middle operation range A2, and the closed-side operation range A3, and also selects the speed of displacement of the door panel 4 based on the ranges A1 to A3, on which the door panel 4 is positioned. However, the control circuit device 31 may alternatively divide the slide range of the door panel 4 into four ranges to control the rotational speed of the slide motor 27 based on each of the divided ranges. In this case, in certain slide ranges, where the proximity of the door panel 4 to the front door or the center pillar may influence the change amount of the capacitance detected by the sensor electrode 52, it is preferable that the speed of displacement of the door panel 4 be set relatively lower. Also, the control circuit device 31 may alternatively control the rotational speed of the slide motor 27 such that the position of the door panel 4 and the speed of displacement of the door panel 4 have a curved-change relation (e.g., a non-linear relation). For example, the control circuit device 31 may control the slide motor 27 such that the speed of displacement of the door panel 4 is gradually increased from the full open position Po and is gradually decreased from the middle point of the slide range toward the full closed position Pc. That is, the speed of displacement of the door panel 4 becomes maximum at the middle point of the slide range of the door panel 4. Also, the control circuit device 31 may divide the slide range of the door panel 4 into two ranges, such as a stepwise change range, where the speed of displacement of the door panel 4 is changed stepwisely, and a gradual change range, where the speed is change gradually. Even when the control circuit device 31 is designed in the above manner, the detectivity for detecting the object X located between the door panel 4 and the periphery of the passenger door opening 3*a* depends on the speed of displacement of the door panel 4. As a result, similar to the above embodiment, because the control (e.g., a control for regularly operating the door panel 4) executed by the control circuit device 31 can be simplified, the control can be more simplified compared with the conventional opening and closing device.

In the above embodiment, the rotational speed of the slide motor 27 is changed (i.e., the speed of displacement of the door panel 4 is changed) by switching the brushes 27*b*, 27*c*, which supply the power to the slide motor 27. However, for example, a PWM control may be additionally provided for a speed control. Also, a normal brush motor, which does not have the high speed brush 27*c*, may be alternatively used to control the speed by only using the PWM control. Furthermore, a motor without brushes, such as a brushless motor, may alternatively serve as a slide motor.

A structure of the sensor body 42 is not limited to the above embodiment. For example, the sensor body 42 may alternatively include the outer cover 51, the sensor electrode 52, a pressure sensitive rubber, and an electrically conductive core electrode. Here, the sensor electrode 52 is provided inside the outer cover 51, and internally has the pressure sensitive rubber, a resistance of which becomes smaller when the pressure sensitive rubber is applied with a press force. Also, the core electrode is provided at the center portion of the pressure sensitive rubber. In this case, the sensor electrode 52 is supplied with a current through the C-V conversion circuit 43, and the core electrode is electrically connected with a current detection element. Then, when the sensor body 42 is applied with the press force, the resistance of the pressure sensitive rubber becomes smaller, and therefore the current flows to the core electrode from the sensor electrode 52 via the pressure sensitive rubber. Then, the current detection element detects the flow of the current between the sensor electrode 52 and the core electrode via the pressure sensitive rubber, and outputs a current detection signal, which is indicative of the flow of the current between the sensor electrode 52 and the core electrode, to the control circuit device 31. When the control circuit device 31 receives the current detection signal, the control circuit device 31 determines the existence of the object X held between the door panel 4 and the periphery of the passenger door opening 3*a* (i.e., the object X is located between the door panel 4 and the periphery of the passenger door opening 3*a*) based on the input of the current detection signal.

In the above embodiment, when the control circuit device 31 determines the existence of the object X located between the door panel 4 and the periphery of the passenger door opening 3*a*, the control circuit device 31 displaces the door panel 4 to the full open position Po. However, when the control circuit device 31 determines the existence of the object X between the door panel 4 and the vehicle 2, the control circuit device 31 may alternatively controls the slide motor 27 such that the door panel 4 is displaced toward the full open position Po by a predetermined amount.

The rotational speed sensor 28 is not limited to the above described structure having the permanent magnet and the hall element, as long as the rotational speed sensor 28 can detect the rotational speed of the slide motor 27. Also, another structure for directly detecting the position of the door panel 4 (e.g., a system with a linear scale) may replace with the rotational speed sensor 28 for detecting the rotational speed of the slide motor 27 to serve as a position detection device.

In the above embodiment, the detection value is the change amount of the capacitance at the sensor electrode 52 per the measuring time t, which change amount is computed based on the change amount of the capacitance detected by the sensor electrode 52 between the sensor electrode 52 and the ground. However, the detection value may alternatively a change amount of the capacitance at the sensor electrode 52 per the measuring time t, which change amount is computed based on the capacitance detected by the sensor electrode 52 between the sensor electrode 52 and the ground.

In the above embodiment, the door panel 4 is provided in a left side of the vehicle 2. However, the door panel 4 may be alternatively provided to a right side of the vehicle 2, or may be provided to each side of the vehicle 2.

Figure 6:
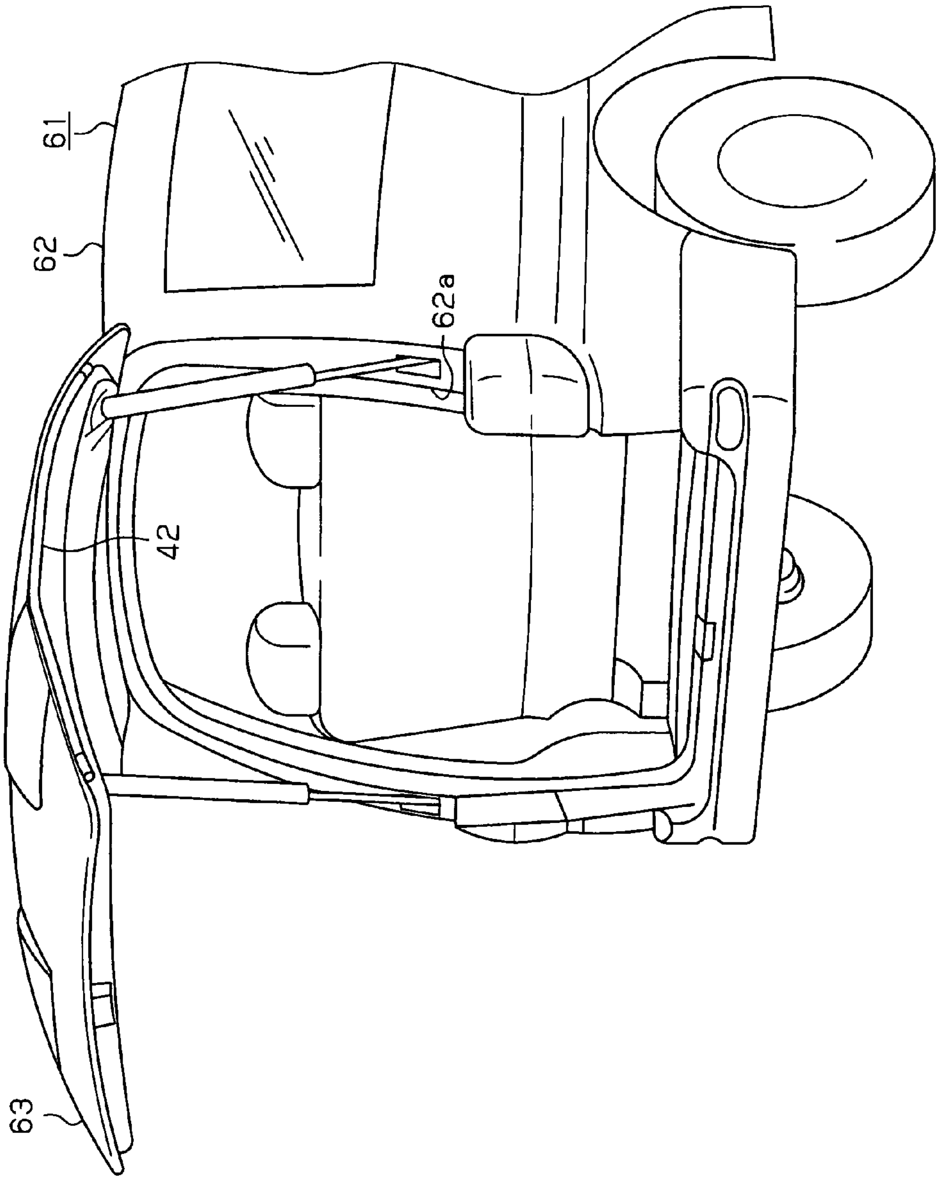
FIG. 6 is a perspective view of a vehicle showing a mounting location of a sensor body according to another embodiment of the present invention.

In the above embodiment, the present invention is described using the power sliding door system 1 as an example of the opening and closing device. However, the present invention may be applied to an opening and closing device, in which a liftgate back door 63 for opening and closing an opening portion 62*a* provided at a rear portion of a body 62 of a vehicle 61 is actuated by a drive motor as shown in FIG. 6. In this case, the sensor body 42 is provided at a position, which is each end portion of the back door 63 in a direction of width of the vehicle (in a transverse direction), and which opposes the periphery of the opening portion 62*a*. Furthermore, the present invention may be applied to a power opening and closing device for opening and closing a storage room door provided to a vehicle using electric power.

Additional advantages and modifications will readily occur to those skilled in the art. The invention in its broader terms is therefore not limited to the specific details, representative apparatus, and illustrative examples shown and described.

What is claimed is:

1. An opening and closing device comprising:

an electrically conductive fixed body that defines an opening portion therein;

a movable body that is displaceable between a full closed position and a full open position, wherein:

the movable body closes the opening portion of the fixed body at the full closed position; and the movable body opens the opening portion of the fixed body at the full open position;

a drive motor that drives the movable body to open and close the opening portion of the fixed body;

a speed control device that controls a rotational speed of the drive motor to change a speed of displacement of the movable body;

a detection assembly that includes a sensor electrode, which is located on an end portion of the movable body toward the full closed position, wherein the detection assembly detects a change of a capacitance formed between the sensor electrode and an electrically conductive object adjacent to the sensor electrode; and a determining device that computes, as a detection value, a change amount of the capacitance at the sensor electrode per a predetermined constant measuring time based on the change of the capacitance detected by the sensor electrode, wherein:

the determining device compares the detection value with a constant threshold value, which is used for determining whether the object exists between the movable body and a periphery of the opening portion;

the determining device determines whether the object exists between the movable body and the periphery of the opening portion based on the comparison result, and the threshold value is determined based on an actual change of the capacitance detected in advance by the sensor electrode in a condition, where the object is absent between the movable body and the periphery of the opening portion during a closing operation of the movable body.

2. The opening and closing device according to claim 1, further comprising:

a position detector that outputs a position detection signal in accordance with a position of the movable body, wherein the speed control device controls the rotational speed of the drive motor based on the position detection signal.

3. The opening and closing device according to claim 2, wherein:

the speed control device controls the rotational speed of the drive motor such that the movable body is displaced at a high speed in a high speed operation range defined between the full open position and a closed-side position, which is located on a side of the full open position toward the full closed position;

the speed control device controls the rotational speed of the drive motor such that the movable body is displaced at a low speed in a low speed operation range that ranges from the closed-side position to a nearly closed position, which is located between the closed-side position and the full closed position; and the movable body is displaced faster at the high speed than at the low speed.

4. The opening and closing device according to claim 1, wherein:

the fixed body is a body of a vehicle; and the movable body is a door panel slidably displaceable along a longitudinal axis of the vehicle for opening and closing the opening portion disposed on a side of the vehicle.

5. The opening and closing device according to claim 1, wherein:

the fixed body is a body of a vehicle; and the movable body is a back door operable for opening and closing the opening portion disposed on a rear portion of the vehicle.

6. The opening and closing device according to claim 1, wherein:

the end portion of the movable body toward the full closed position faces forward in a displacing direction during a closing operation of the movable body for closing the opening portion.

* * * * *